Patented Apr. 29, 1952

2,594,271

UNITED STATES PATENT OFFICE 2,594,271

METHOD OF FORMYLATING TETRAHYDRO PTEROIC ACID AND AMINO ACID AMIDES THEREOF

Marvin Jay Fahrenbach, Plainfield, N. J., assignor to American Cyanamid Company, New York, N. Y., a corporation of Maine No Drawing. Application August 5, 1950, Serial No. 177,959

5 Claims. (Cl. 260—251.5)

This invention relates to a new process of preparing substances having physiological activity. More particularly, it relates to a method of formulating certain substituted pteridine derivatives.

In 1948 Sauberlich and Baumann, Journal of Biological Chemistry, 176, page 165 (1948), recognized the existence of a substance that stimulated the growth in a synthetic medium of *Leuconostoc citrovorum*. This unknown substance was found to be present in commercial liver extracts and also in liver and a wide variety of natural materials. Subsequent work has shown that the growth factor was not pteroylglutamic acid, vitamin $B_{12}$, or any of the other previously identified vitamins that occur in liver and other natural products. It has also been subsequently found that the unknown substance can replace the folic acid requirement of micro-organisms and chicks. It has further been found that the growth factor will reverse the action of pteroylglutamic acid antagonists and, surprisingly, will reverse the toxic effects of aminopterin (N-{[(2,4-diamino-6-pyrimido[4,5-b]pyrazyl)meth-yl]amino}benzoyl]glutamic acid) in mice and bacteria, under conditions in which pteroylglutamic acid is ineffective.

The *citrovorum* factor exists in natural products in extremely minute quantities so that its recovery therefrom is exceedingly difficult and practically impossible from a commercial point of view. However, I have discovered that it is possible to prepare compounds having the same or related biological activity by a process which makes the production of adequate amounts of the activity a commercial possibility so that it may be used in medicine. Since the chemical structure of the *Leuconostoc citrovorum* growth factor described by Sauberlich et al. has not been elucidated as yet, it is not possible to say at this time whether any of the products produced by the process described hereinafter are the same or not, even though they have the same biological activity. Insofar as I am aware, however, the structure of the products covered by the present invention have not been previously described in the chemical literature.

A method of preparing the compounds of the present invention has been described and claimed in copending applications of coworkers Hultquist and Roth, Serial Number 153,484, filed April 1, 1950, and also Serial Number 159,152, filed April 29, 1950, wherein reduced pteroic acid and amino acid amides thereof are formylated with formic acid, an alkyl formate, etc. This process, under most conditions, requires a temperature of 50° to 200° C., which is higher than that used in the present invention, and the yields of product obtained are lower than in the process described herein.

In accordance with the process of the present invention I have now found that reduced pteroic acid and amino acid amides thereof can be formylated with an alkyl formimino ether at a low temperature to produce better yields of the desired product. The intermediates which can be used are the reduced pteroic acid and amino acid amides thereof, particularly reduced pteroylglutamic acid, reduced pteroylglutamylglutamyl-glutamic acid and other amino acid amides of reduced pteroic acid such as aspartic acid, alanine, serine and others. The salts of these compounds may be used in the process as well. A method of preparing a representative of these intermediates is described in the examples hereinafter.

The exact structure of the compounds produced by formylation of reduced pteroic acid or one of its amides with an alkyl formimino ether has not been definitely determined as yet due to their complex nature. It is believed, however, that they may be represented by one of the following formulas:

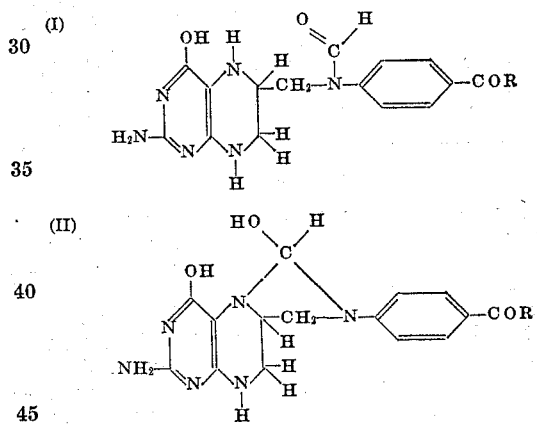

In these, R represents a hydroxyl radical or a radical of an amino acid. It will be understood that both of the above may exist in tautomeric forms, depending upon the conditions in which they are present.

The alkyl formimino ethers which I can use in the present invention are those such as ethyl formimino ether, propyl formimino ether, and the like.

The reaction is caused to take place in a solvent such as an aqueous alkaline solution. The reaction can also be made to take place in an anhydrous medium such as glycol, glycol-glacial acetic acid, methyl Cellosolve acetate, etc.

The reaction to produce the compounds of the present invention will take place within a temperature range of from 0° C. to 60° C. The time required for the reaction to be substantially complete is from 30 minutes to about 6 hours.

After the formylation, the product may be directly filtered off, depending upon the solvent used, or the solution may be buffered in aqueous sodium bicarbonate and the resulting solution is found to be active. When the product is prepared in an organic solvent the product can be obtained by pouring the reaction mixture into ether and isolating the insoluble active product by filtration. Purification can be accomplished by chromatographic adsorption on magnesium silicate followed by elution or by fractional recrystallization of one of the metallic salts.

The process of the invention will now be illustrated in greater detail by means of the following examples.

Example 1

(a) 10 parts of pteroylglutamic acid (90% purity; 8% water) is slurried in 300 parts by volume of glacial acetic acid and 200 parts by volume of ethylene glycol. To this slurry is added one part of platinum oxide and hydrogenation is carried out until no more gas is absorbed; approximately 2 to 2.5 mols of hydrogen are taken up. The catalyst is filtered off under nitrogen and the filtrate is used immediately for reaction with ethyl formimino ether; volume of the filtrate is 530 parts or 0.017 part of pteroylglutamic acid per volume of solution.

(b) 30 parts by volume of the reduced pteroylglutamic acid solution prepared in (a) above is poured into aqueous sodium bicarbonate to which has been added 1.27 parts ethyl formimino ether hydrochloride; the neutralization is carried out at 0° to 5° C. The yield of *citrovorum* factor activity is about 25%.

Example 2

A portion of the aqueous solution obtained as in Example 1 (b) is adjusted under nitrogen to pH 11.0 to 12.0 with sodium hydroxide and heated for ½ hour at 55° to 60° C. The pH is then lowered to 7.0 to 8.0 with glacial acetic acid. Bioassay shows a yield of *citrovorum* factor activity of about 30%.

Example 3

A further 30 parts by volume sample of reduced pteroylglutamic acid solution (prepared as in Example 1 (a)) is poured into water containing 1.2 parts of ethyl formimino ether hydrochloride while maintaining the pH between 11.0 and 12.0 by occasional addition of 20% sodium hydroxide solution and the temperature at 0° to 5° C. The final volume obtained is 250 parts. Bioassay shows a yield of about 30% *citrovorum* factor activity.

Example 4

A portion of the aqueous solution obtained in Example 3 is heated under nitrogen for ½ hour at 55° to 60° C. The pH is then lowered to 7.0 to 8.0 with glacial acetic acid. Bioassay shows a yield of about 25% *citrovorum* factor activity.

Example 5

(a) To 30 parts by volume of reduced pteroylglutamic acid solution (prepared as in Example 1 (a)) is added 1.27 parts of ethyl formimino ether hydrochloride. This solution is then treated as follows:

(b) 10 volumes of the solution from Example 5 (a) is poured into aqueous sodium bicarbonate at 0° to 5° C.; final volume is 166 parts. Bioassay of this solution shows a yield of *citrovorum* factor activity equal to about 38%.

(c) A portion of the bicarbonate solution prepared in Example 5 (b) above is adjusted under nitrogen to pH 11.0 to 12.0 with sodium hydroxide and heated for ½ hour at 55° to 60° C. The pH is then lowered to 7.0 to 8.0 with glacial acetic acid. The yield of *citrovorum* factor activity is about 43%.

(d) 10 volumes of reduced pteroylglutamic acid solution as prepared in Example 5 (a) is buffered to a pH between 11.0 and 12.0 by occasional addition of 20% sodium hydroxide solution and the temperature maintained at 0° to 5° C. The final volume is 166 parts. The yield of *citrovorum* activity by bioassay is about 28%.

(e) A portion of the aqueous solution prepared in Example 5 (d) above is heated under nitrogen for ½ hour at 55° to 60° C. The pH is then lowered to 7.0 to 8.0 with glacial acetic acid. The yield of *citrovorum* factor activity by bioassay is about 50%.

(f) 10 volumes of reduced pteroylglutamic acid solution prepared as in Example 5 (a) above is heated to 50° to 60° C. for ½ hour under nitrogen then poured into aqueous sodium bicarbonate; final volume is 166 parts. Bioassay indicates a 20% yield of *citrovorum* factor activity.

(g) A portion of the bicarbonate solution prepared in Example 5 (f) is adjusted under nitrogen to a pH of 11.0 to 12.0 with sodium hydroxide and heated for ½ hour at 55° to 60° C. The pH is then lowered to 7.0 to 8.0 with glacial acetic acid. Yield of *citrovorum* factor activity by bioassay is 30%.

I claim:

1. A method of preparing a member of the group consisting of tetrahydroformyl pteroic acid and amino acid amides of tetrahydroformyl pteroic acid which comprises treating a compound of the group consisting of tetrahydro pteroic acid and amino acid amides of tetrahydro pteroic acid with an alkyl formimino ether.

2. A method of preparing tetrahydroformyl pteroic acid amides of amino acids which comprises subjecting tetrahydropteroic acid amides of amino acids to the action of an alkyl formimino ether.

3. A method which comprises the step of treating tetrahydropteroylglutamic acid with an alkyl formimino ether.

4. A method which comprises the steps of treating tetrahydropteroylglutamic acid with ethyl formimino ether in the presence of an aqueous alkaline medium at a temperature within the range of 0° C. to 60° C.

5. A method which comprises the steps of subjecting tetrahydropteroylglutamic acid to the action of ethyl formimino ether at a temperature within the range of 0° C. to 60° C. for a period of from ½ hour to 6 hours.

MARVIN JAY FAHRENBACH.

No references cited.